2 Sheets—Sheet 1.

P. B. DOTY.
Seed Planter.

No. 201,508. Patented March 19, 1878.

Witnesses:
P. C. Dieterich
Frank H. Duffy

Inventor:
Peter B. Doty
per C. H. Watson & Co. Attorneys.

N. PETERS, PHOTO-LITHOGRAPHER, WASHINGTON, D C.

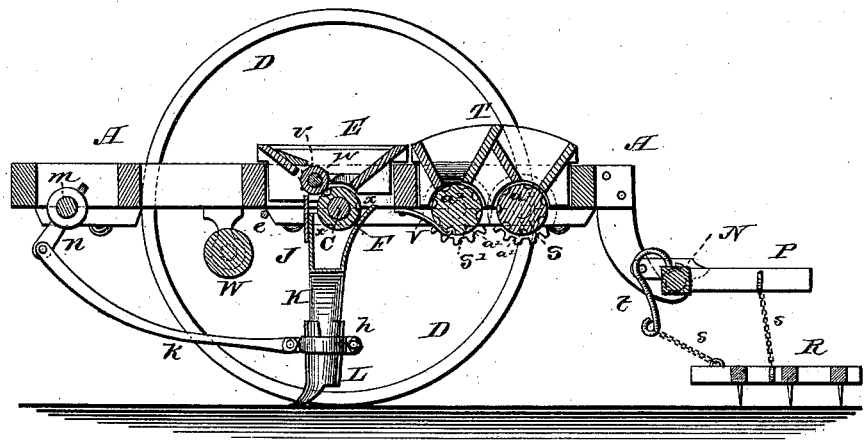
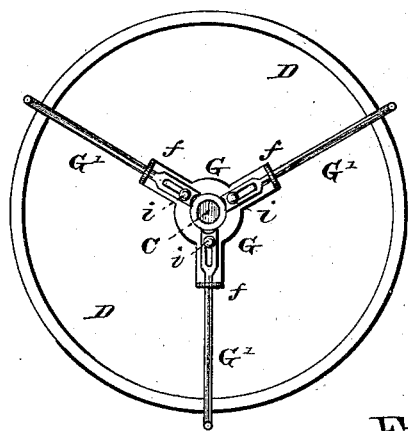
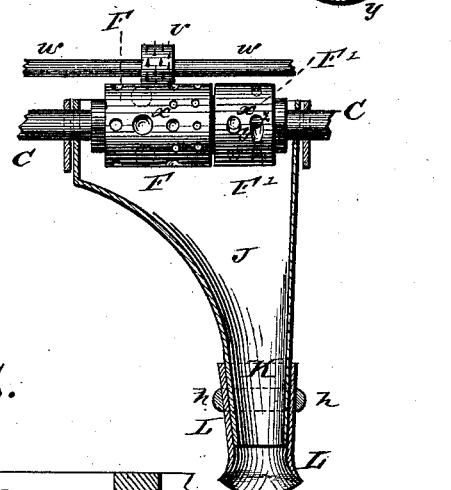
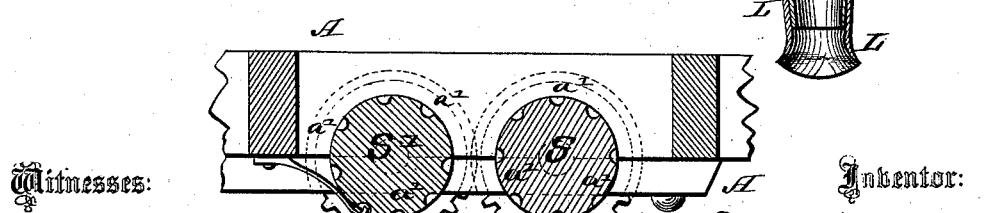

UNITED STATES PATENT OFFICE.

PETER B. DOTY, OF CONNEAUT, OHIO.

IMPROVEMENT IN SEED-PLANTERS.

Specification forming part of Letters Patent No. 201,508, dated March 19, 1878; application filed February 4, 1878.

*To all whom it may concern:*

Be it known that I, PETER B. DOTY, of Conneaut, in the county of Ashtabula and State of Ohio, have invented certain new and useful Improvements in Seed-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a machine for planting all kinds of seed, as will be hereinafter more fully set forth.

Figure 1:
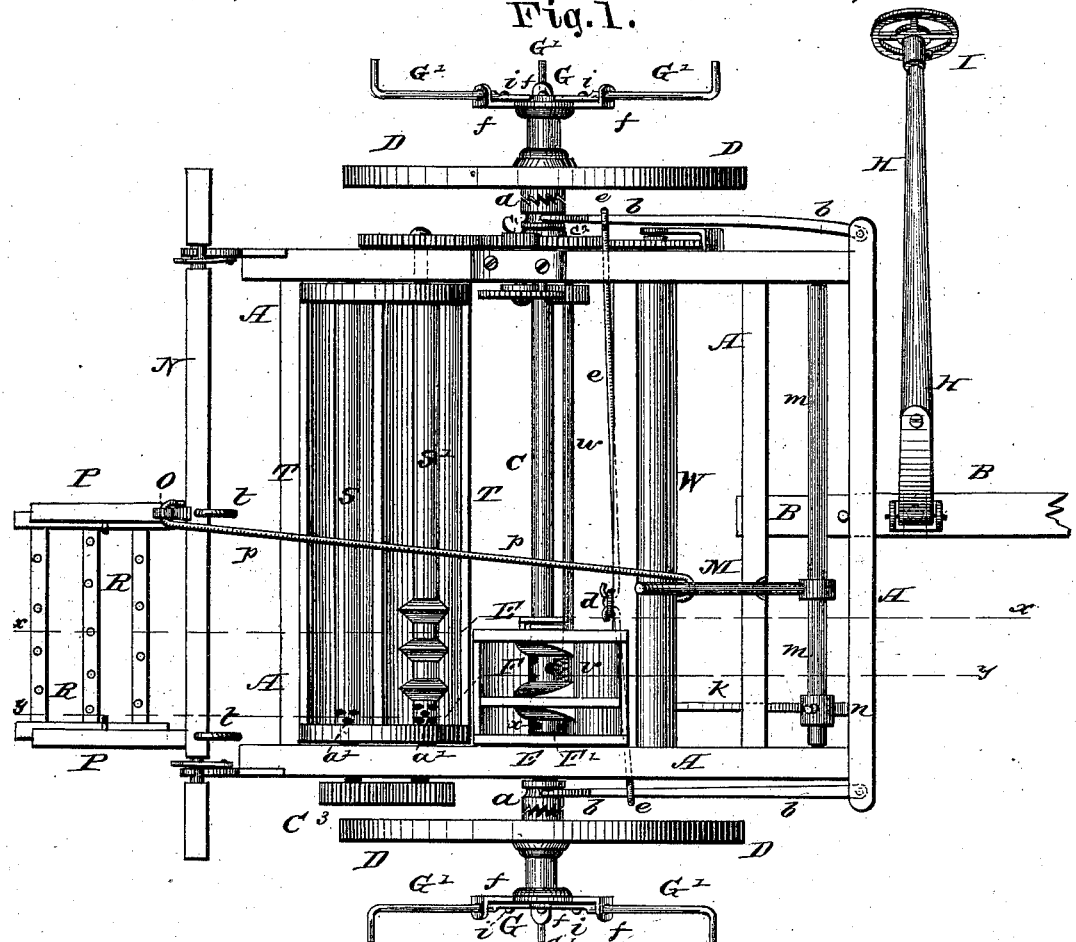
Figure 2:
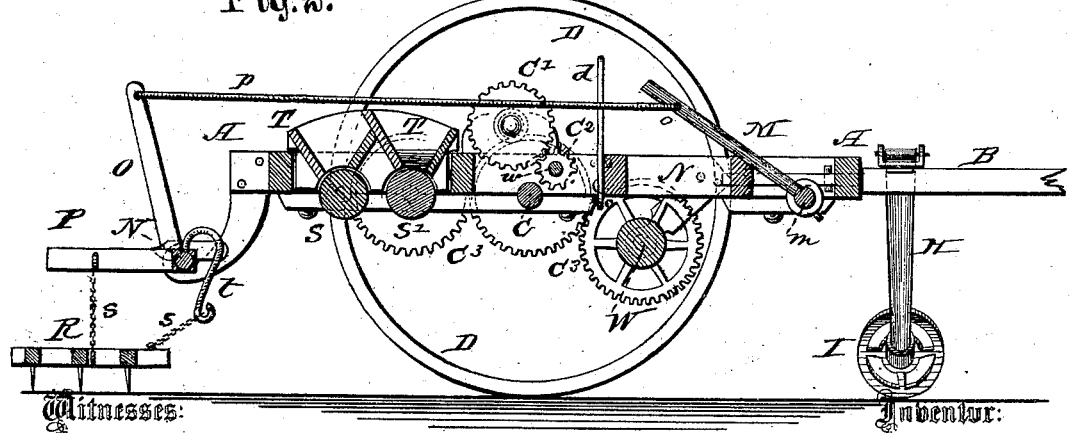

In the annexed drawings, to which reference is made, and which fully illustrate my invention, Figure 1 is a plan view. Fig. 2 is a vertical section on line $x\ x$, Fig. 1. Fig. 3 is a vertical section on line $y\ y$, Fig. 1; and Figs. 4, 5, 6, and 7 represent detail views of my invention.

A represents the frame of my planter, provided with the tongue B, and having the axle C placed in suitable boxes. D D are the driving-wheels, placed loosely on the axle, and clutches $a\ a$ arranged to throw the wheels in and out of gear with the axle. Each clutch $a$ is surrounded by an arm, $b$, pivoted at the front end of the frame, and said arms connected by rods $e\ e$ with a lever, $d$, for throwing said clutches $a\ a$ in and out simultaneously.

On the axle C are secured two cylinders, F and F', under each hopper E, which hopper is divided into two compartments, one for grain and the other for fertilizer.

The shorter cylinder F' is for fertilizer, and the longer one for grain. This latter cylinder is arranged with cavities, for planting in hills and drills. The cylinder F' is also provided with cavities of different size, for the same purpose.

On each end of the axle C, outside of the wheel D, is secured a disk, G, with radially-projecting arms $f$, forming at their outer ends eyes or loops, through which are passed the marking-arms G', which have their inner ends slotted and fastened by screws $i$, whereby said marking-arms may be adjusted out and in, as required. These markers are for the purpose of marking off the ground for rows across the field.

The feed-cylinders F F' are made adjustable on the axle C, so as to make the grain and fertilizer strike the ground at the same time as the markers make their mark.

On the rear end of the tongue B is hinged a gage-pole, H, with a rotating wheel, I, on its end, for making a continuous mark on the ground at the right distance for driving the next time across the field. This gage-pole can be thrown from side to side, to be used on either side of the machine.

Under each hopper is a conductor, J, with tube K, said conductor being hung on the axle C, as shown, and can, with the cylinders, be arranged at any point on the axle. On the tube K is fastened the plow L, which is made at the top in tubular form, to fit around the tube K, and fastened thereto by a clamp, $h$, which allows of the plow being adjusted up and down on said tube.

Each plow L is, by a rod, $k$, connected with an arm, $n$, projecting downward from a shaft, $m$, at the front of the frame A, and said shaft provided with a lever, M, by the aid of which the plows may be raised up from the ground while turning around or in transit.

At the rear end of the frame A, in suitable hangers, is placed a shaft or rocking bar, N, provided with an upwardly-extending arm, O, and this arm is, by a rod, $p$, connected with the lever, M, on the shaft $m$. This rocking bar is also provided with rearwardly-extending arms P P, from which, by chains, are suspended harrows R, the front ends of said harrows being, by other chains, connected with spring-arms $t$ from the bar N. $s\ s$ are the chains suspending the harrows. It will be seen that these harrows are lifted simultaneously with the plows L by the use of the lever M.

Opposite the grain-outlet, to or in each hopper E, is placed a small wheel or cylinder, $v$, on a rotating shaft, $w$, which wheel or cylinder is roughened on its face, like a grater, and acts as a cut-off, to prevent more than the desired quantity to pass through; and if any grain should become jammed in the feed-cylinder cavities, this grater cut-off will move away such grain, and allow the underneath grain to pass out.

The cavities $x$ for corn in the feed-cylinder has a run, $y$, in the side at the back, which admits of the surplus grain moving readily backward when the same comes in contact with the revolving cut-off.

At the bottom of the cavity $x$ is an incline, $z$, backward, which prevents two grains from getting wedged into the cavity. With a flat bottom this would sometimes happen, and the grater-wheel $v$ would then destroy the grain, while with the inclined bottom $z$ the grains can only lodge in such a position that the wheel or cylinder $v$ can easily knock one of them out.

On the axle C, outside of the frame A, at one end, is secured a cog-wheel, $C^1$, which transmits motion, through cog-wheels $C^2$, to the shaft $w$, as shown.

In the back part of the frame A are arranged two cylinders, S S', which are designed for planting wheat and kindred kinds of grain in drills. They receive their motion, by cog-wheels $C^3$, from the wheel $C^1$ on the axle, and are arranged under a double hopper, T, one for fertilizer and the other for seed. By having different sets and sizes of cavities properly arranged around the cylinders, all of the different kinds of grain can be planted by the drill apparatus. These cylinders are to be provided with double rows of cavities $a'$ $a'$, arranged alternately, as shown, whereby a steady and even flow of grain will follow.

V is a scraper, arranged to scrape out the cavities $a'$ as the cylinder revolves. This is specially designed for fertilizer, as the cavities might become clogged with the same.

Under the front part of the frame is a cylinder, W, designed for sowing grass-seed, and over the same will be placed an open full hopper.

Having thus fully described my invention, what I claim as new, and desire to secure by Letters Patent, is—

1. In a seed-planter, a revolving cylinder, in combination with hopper E, the roughened cylinder $v$, shaft $w$, and the feeding-cylinder, all constructed and arranged as and for the purpose set forth.

2. In a corn-planter, the feed-cylinder having cavities $x$, with inclined bottoms $z$ and runs $y$, in combination with the roughened cut-off $v$, and spout K, substantially as described.

3. The combination of the conductor J with tube K and the adjustable plow L, having tubular shank, secured by a clamp, $h$, substantially as set forth.

In testimony that I claim the foregoing as my own I have hereto affixed my signature in presence of two witnesses.

PETER B. DOTY.

Witnesses:
ALLEN M. COX,
WILLIAM A. CHILDS.